United States Patent [19]
Prater

[11] Patent Number: 5,906,135
[45] Date of Patent: May 25, 1999

[54] COAST CLUTCH WITH POWER TAKE OFF GEAR

[75] Inventor: Ronald E. Prater, Rochester, Mich.

[73] Assignee: Koppy Corporation, Orion, Mich.

[21] Appl. No.: 08/946,822

[22] Filed: Oct. 8, 1997

[51] Int. Cl.⁶ .............................. B21D 39/00; F16H 55/00
[52] U.S. Cl. ........................ 74/446; 29/521; 29/522.1; 29/893.1; 29/893.2; 403/359; 403/375
[58] Field of Search ................... 29/521, 522.1, 29/893.1, 893.2; 74/446; 403/359, 375

[56] References Cited

U.S. PATENT DOCUMENTS

| | | | |
|---|---|---|---|
| 3,635,529 | 1/1972 | Nass | 29/521 X |
| 3,841,452 | 10/1974 | Newsock et al. | 192/107 R |
| 4,014,619 | 3/1977 | Good et al. | 403/359 |
| 4,089,097 | 5/1978 | Good et al. | 29/163.5 R |
| 4,523,872 | 6/1985 | Arena et al. | 403/359 X |
| 4,716,756 | 1/1988 | Fujioka et al. | 72/353 |
| 4,813,522 | 3/1989 | Fujioka et al. | 192/70.2 |
| 4,945,782 | 8/1990 | Farrell | 74/431 |
| 5,069,575 | 12/1991 | Anderson | 403/359 |
| 5,078,536 | 1/1992 | Anderson | 403/359 |
| 5,180,043 | 1/1993 | Walker | 192/70.2 |
| 5,305,943 | 4/1994 | Walker | 228/176 |

Primary Examiner—Allan D. Herrmann
Attorney, Agent, or Firm—Howard & Howard

[57] ABSTRACT

A transmission assembly includes an inner housing member and an outer band member. The outer band member is slidingly received over the outer surface of the inner housing member. An inner surface of the outer band member includes a plurality of notches. After the outer band member is placed in a desired radial and axial alignment with the inner housing member, a plurality of deformations are lanced in the inner housing member. The deformations extend radially outward into the notches formed in the band member. The cooperation between the lanced deformations and the notches maintain the two pieces of the transmission assembly in an desired axial and radial alignment.

18 Claims, 2 Drawing Sheets

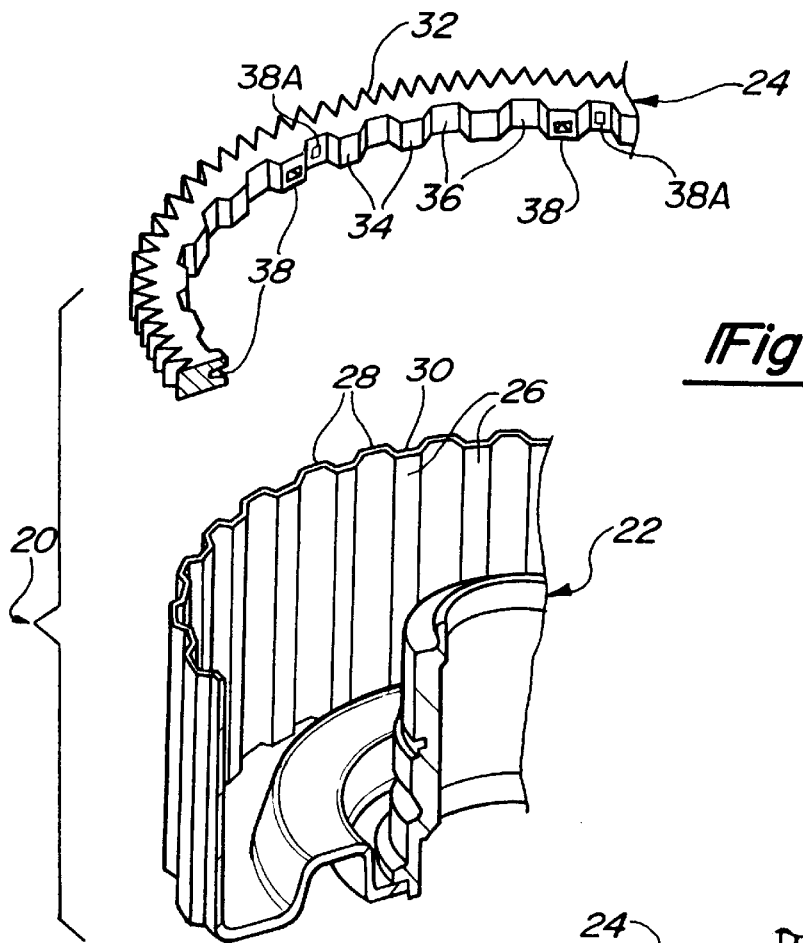
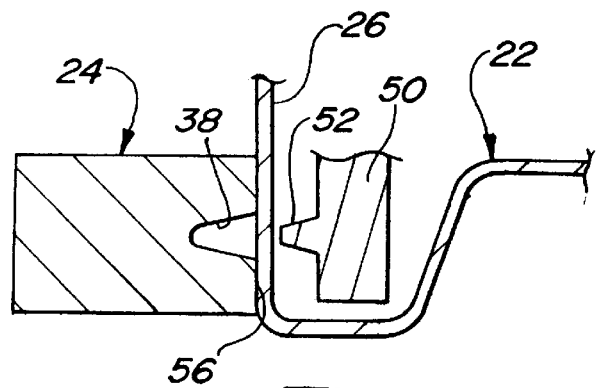
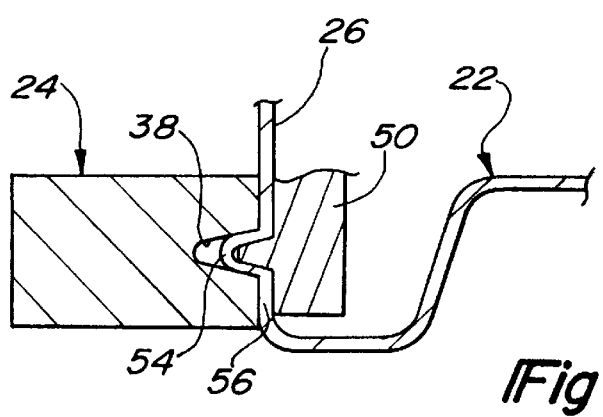

COAST CLUTCH WITH POWER TAKE OFF GEAR

BACKGROUND OF THE INVENTION

This invention generally relates to a vehicle transmission assembly having a power take off gear attached to the outside of an inner housing member.

In some automotive vehicle transmissions, a power take off gear is provided on the outside of a clutch housing member. In most instances the power take off gear is welded onto the outside of the clutch housing member. While such an arrangement has proven useful for many applications, it is not without shortcomings and drawbacks. For example, a welding process typically includes the formation of a flash on the exterior of the clutch housing that must be removed. Introducing an additional step of removing the undesirable flash during the manufacturing process adds additional labor and expense. Another shortcoming of welded arrangements is that the welding process can weaken or otherwise compromise the integrity of the clutch housing and/or the power take off gear especially when the welding process is not accurately or properly performed. A further difficulty is sometimes encountered when a secure weld is not achieved.

There is a need for an assembly process and an arrangement that results in a more efficient and reliable configuration. This invention addresses those needs by providing a transmission assembly that overcomes the drawbacks and shortcomings of the conventional arrangements.

In general terms, this invention is a transmission assembly having an inner housing member and an outer band member. The outer band member can be, for example, a power take off gear. The inner housing member preferably includes a plurality of circumferentially spaces splines on an inner surface of the housing member. An inner surface of the outer band member includes a plurality of notches. The outer band member is slid over the outer surface of the inner housing member and the two pieces are placed in a desired axial and radial alignment. A plurality of deformations are then formed in the inner housing member that protrude radially outward into the notches of the inner band member. The deformations preferably are lanced, using a lancing tool that acts upon the interior of the inner housing member. The placement of the deformations within the notches on the outer band member serves to maintain the outer band member in a proper axial and radial alignment with the inner housing member.

The various features and advantages of this invention will become apparent to those skilled in the art from the following detailed description of the presently preferred embodiments. The drawings that accompany the detailed description can be described as follows.

BRIEF DESCRIPTION OF THE DRAWINGS

FIG. 1 is a perspective, exploded illustration of a transmission assembly designed according to this invention.

FIG. 2 is a cross-sectional illustration of selected portions of the embodiment of FIG. 1.

FIG. 3 illustrates the embodiment of FIG. 2 at a later stage during the preferred manufacturing process.

DETAILED DESCRIPTION OF THE PREFERRED EMBODIMENTS

Figure 4:
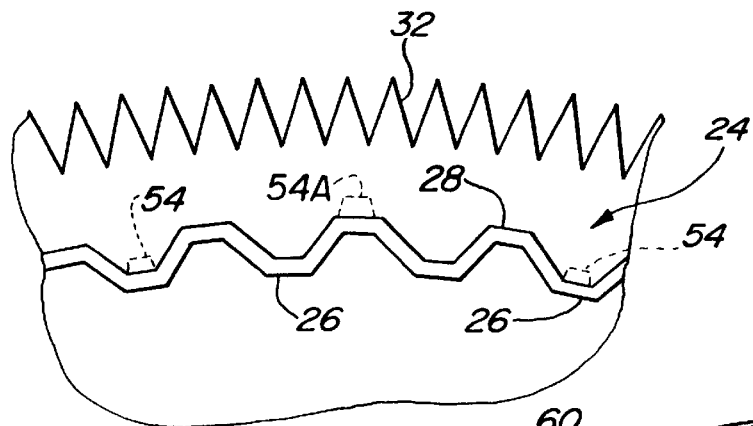
FIG. 4 is a top elevational view of a selected portion of a transmission assembly designed according to this invention.

FIG. 1 illustrates a transmission assembly 20 that includes an inner housing member 22 and an outer band member 24. The inner housing member 22 preferably is generally cylindrical in shape. In this example, the inner housing member 22 is a transmission clutch housing. The inner housing member 22 includes a plurality of splines 26 on an inner surface of the outermost portion of the housing member 22. An outer surface includes a plurality of splines 28 that are interdigitated with a plurality of grooves 30. The grooves 30 are aligned with the splines 26 as can be appreciated from the drawing.

The outer band member 24 is often referred to as a power take off gear. The outer band member includes an outer surface 32 that has a plurality of gear teeth. An inner surface of the band member 24 includes a plurality of keys 34. The keys 34 are circumferentially spaced around the inner surface of the band member 24 with a plurality of spacers 36 in between the keys 34.

A plurality of notches 38 are formed on the inner surface of the band member 24. In the illustrated embodiment, the notches 38 are formed on the keys 34 of the band member 24. Alternatively, the notches 38 could be formed on the spacer portions 36 as shown at 38A in FIG. 1. The inner housing member 22 and the outer band member 24 preferably are both annular.

FIG. 2 illustrates, in cross-sectional view, selected portions of the embodiment of FIG. 1. The outer band member 24 has been slid over the outer portion of the inner housing member 22. FIG. 2 schematically illustrates a lancing tool 50 that has a radially outward projection 52. The lancing tool 50 preferably is aligned with the portion of an inner housing member inner surface spline 26 that is coincident with a notch 38. The lancing tool 50 is then moved radially outward to deform the appropriate portion of the inner housing member 22. A deformation 54 (illustrated in FIG. 3) is formed and extends outwardly into the notch 38. In the preferred method of this invention, a single deformation 54 is formed at one time and the lancing tool 50 is then indexed into position to lance additional deformations into each of the notches 38.

As illustrated in FIGS. 2 and 3, the notches 38 preferably are axially aligned on the inner surface of the band member 24 such that an abutment surface 56 is adjacent either axial side of the notch 38. The abutment surfaces 56 serve to engage the outer surface of the inner housing member 22 so that when the deformation 54 is formed by the lancing tool 50, the adjacent portions of the inner housing member 22 are not deformed in an undesirable manner.

Figure 5:
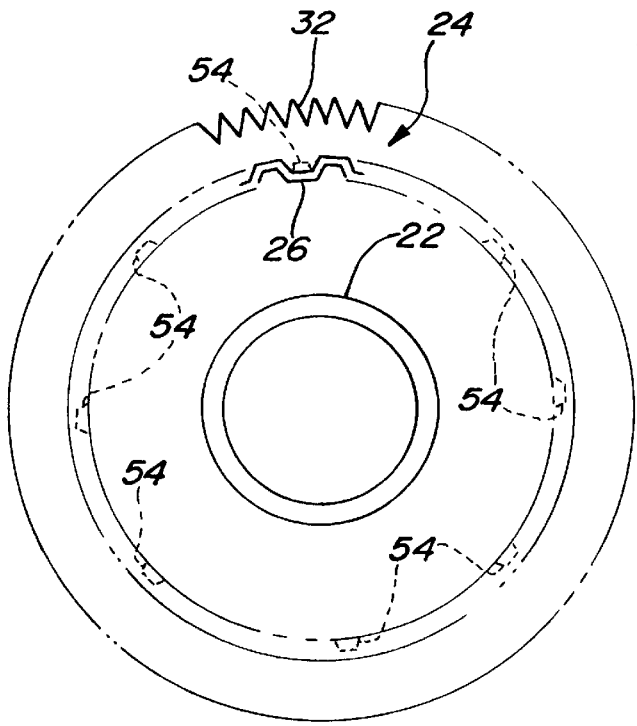
FIG. 5 is a top elevational view of a completed assembly.

FIGS. 4 and 5 illustrate a completed assembly showing how the deformations 54 (shown in phantom) protrude outward from the interior of the inner housing member 22 and into the notches 38. Alternatively, deformations 54A correspond to the notches 38A provided on the spacers 36. Any number of notches 38 can be used, however, it has been found that at least three notches should be provided.

Figure 6:
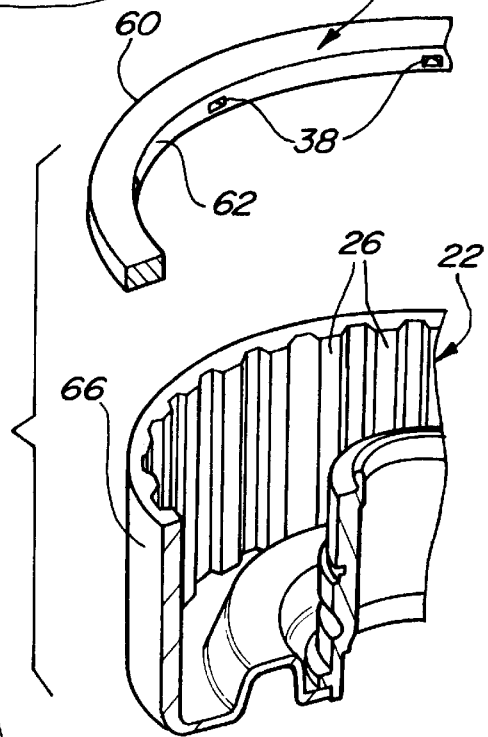
FIG. 6 is an exploded, perspective, exploded illustration of a second embodiment of a transmission assembly designed according to this invention.

FIG. 6 is an exploded, perspective illustration of another embodiment of this invention. The main differences between the embodiments of FIGS. 1 and 6 is that the embodiment of FIG. 6 includes an outer band member 24 that has a generally smooth outer surface 60 and a generally smooth inner surface 62. The diameters of the outer surface 60 and inner surface 62 preferably are each constant along the entire periphery of the outer band member 24. The inner housing member 22 includes a generally smooth outer surface 66 that preferably has a constant outer diameter. The outer band member 24 is slid onto the outer surface of the inner housing member 22 and a plurality of deformations are formed so that the outer band member 24 and the inner housing member 22 are maintained in a desired radial and axial alignment.

One difference between the embodiments of FIG. 6 and FIG. 1 is that the nesting fit between the keys 34 and the grooves 30 and the splines 28 with the spacer portions 36 in the latter serve to maintain a radial alignment between the inner housing member 22 and the outer band member 24. Since the outer surface 66 of the inner housing member 22 and the inner surface 62 of the outer band member 24 (in the embodiment of FIG. 6) do not include interdigitated splines or keys, the deformations 54 within the notches 38 serve as the sole structure that maintains both radial and axial alignment between the inner housing member 22 and the outer band member 24.

A significant reduction in manufacturing tooling and labor costs can be realized by making transmission assemblies according to this invention. The further advantage of realizing an efficient and stable coupling of the inner housing and outer band member is realized.

The foregoing description is exemplary rather than limiting in nature. Variations and modifications to the disclosed embodiments may become apparent to those skilled in the art that do not necessarily depart from the purview and spirit of this invention. Accordingly, the legal scope of protection afforded this invention can only be determined by studying the following claims.

What is claimed is:

1. A transmission assembly, comprising:
    a generally cylindrical inner clutch housing member having an outer surface and an inner surface including a plurality of splines on said inner surface;
    a generally annular outer band member having an inner surface with a plurality of notches formed through said band member inner surface such that said notches extend into said band member in a generally radially outward direction, said band member inner surface being received about said outer surface of said inner housing member; and
    wherein said inner housing includes a plurality of deformations extending generally radially outward from said housing member outer surface into said outer band member notches whereby said outer band member is maintained in a selected position relative to said inner housing member.

2. The transmission assembly of claim 1, wherein said inner housing member outer surface includes a plurality of spline portions interspersed with a plurality of grooves and wherein said outer band member inner surface includes a plurality of keys interdigitated with a plurality of spacers, said keys being received within said grooves.

3. The transmission assembly of claim 2, wherein said outer band member notches are formed on said keys.

4. The transmission assembly of claim 3, wherein said deformations are lanced portions of said inner housing.

5. The transmission assembly of claim 2, wherein said outer band member notches are formed on said spacers and said inner housing deformations extend radially outward from said outer surface spline portions.

6. The transmission assembly of claim 5, wherein said inner housing deformations are lanced portions of said inner housing.

7. The transmission assembly of claim 1, wherein said inner housing outer surface has a generally constant outer diameter and said outer band member inner surface has a generally constant inner diameter that is slightly larger than said housing outer diameter and wherein said notches and said deformations cooperate to maintain said outer band member in a selected radial and axial alignment with said inner housing member.

8. The transmission assembly of claim 7, wherein said inner housing deformations are lanced portions of said inner housing.

9. The transmission assembly of claim 1, wherein said band member includes abutment surfaces on either axial side of said notches, said abutment surface abutting said outer surface of said inner housing member adjacent said deformations.

10. A transmission assembly, comprising:
    a generally cylindrically inner housing member having an outer surface and an inner surface, the outer surface including a plurality of spline portions interspersed with a plurality of grooves;
    a generally annular outer band member having an inner surface with a plurality of notches formed through the band member inner surface such that the notches extend into the band member in a generally radially outward direction, the band member inner surface including a plurality of keys interdigitated with a plurality of spacers, the band member inner surface being received about the outer surface of the inner housing member such that the keys are received within the grooves; and
    wherein the inner housing includes a plurality of deformations extending generally radially outward from the housing member outer surface into the outer band member notches whereby the outer band member is maintained in a selected position relative to the inner housing member.

11. A method of making a transmission assembly having an outer band member and an inner clutch housing member, comprising the steps of:
    (A) forming a plurality of notches on an inner surface on the band member;
    (B) aligning the inner clutch housing member with the outer band member such that the inner surface on the outer band member is adjacent an outer surface of the inner housing member; and
    (C) subsequently deforming a plurality of portions of the inner housing member from an interior of the inner housing member such that the deformed portions protrude into the notches on the band member whereby the inner housing member and outer band member are maintained in the alignment from step (B).

12. The method of claim 11, wherein step (C) is performed by lancing a portion of the inner housing member in a generally radially outward direction.

13. The method of claim 12, wherein step (C) is performed by successively lancing individual portions of the inner housing member until a desired number of portions are deformed.

14. The method of claim 12, wherein step (C) is performed by lancing the portions of the inner housing member using a lancing tool that engages a portion of an inner surface of the housing member and moves the portion radially outward.

15. The method of claim 11, wherein step (A) is performed by forming at least three notches in the outer band member.

16. The method of claim 11, wherein step (B) is performed by sliding the outer band member over and onto the inner housing member.

17. The method of claim 11, wherein step (A) includes axially aligning the notches on the band member such that an abutment surface exists on either axial side of each notch.

18. The method of claim 17, wherein step (C) is performed by maintaining the abutment surfaces against the outer surface of the inner housing member to thereby prevent any undesired deformation of the inner housing member adjacent the desired deformations.

* * * * *